(12) United States Patent
Wigren

(10) Patent No.: US 8,175,537 B2
(45) Date of Patent: May 8, 2012

(54) METHOD AND ARRANGEMENT FOR NOISE FLOOR ESTIMATION

(75) Inventor: Torbjorn Wigren, Uppsala (SE)

(73) Assignee: Telefonaktiebolaget L M Ericsson (publ) (SE)

( * ) Notice: Subject to any disclaimer, the term of this patent is extended or adjusted under 35 U.S.C. 154(b) by 716 days.

(21) Appl. No.: 12/307,345

(22) PCT Filed: Jul. 5, 2006

(86) PCT No.: PCT/SE2006/050242
§ 371 (c)(1),
(2), (4) Date: Jan. 2, 2009

(87) PCT Pub. No.: WO2008/004924
PCT Pub. Date: Jan. 10, 2008

(65) Prior Publication Data
US 2009/0311968 A1  Dec. 17, 2009

(51) Int. Cl.
*H04B 17/00* (2006.01)
*H04B 15/00* (2006.01)
(52) U.S. Cl. .............. 455/67.13; 455/63.1; 455/226.3
(58) Field of Classification Search ............. 455/67.13
See application file for complete search history.

(56) References Cited

U.S. PATENT DOCUMENTS

| | | |
|---|---|---|
| 5,936,965 A | 8/1999 | Doshi et al. |
| 6,760,567 B1 * | 7/2004 | Jeong et al. ............ 455/67.11 |
| 2004/0122667 A1 * | 6/2004 | Lee et al. .................. 704/233 |
| 2005/0105657 A1 * | 5/2005 | Kroeger et al. ............. 375/347 |

FOREIGN PATENT DOCUMENTS

| | | |
|---|---|---|
| EP | 0 963 071 A1 | 12/1999 |
| SU | 1133673 A | 1/1985 |
| WO | WO 2004/013987 A1 | 2/2004 |
| WO | WO 2006/014342 A2 | 2/2006 |
| WO | WO 2006/038786 A1 | 4/2006 |
| WO | WO 2007/024166 A1 | 3/2007 |
| WO | WO 2007/087648 A1 | 8/2007 |

OTHER PUBLICATIONS

International Search Report dated May 14, 2007 (3 pages).
Holma et al., "WCDMA for UMTS—Radio Access for Third Generation Mobile Communications", Chichester, UK; Wiley, 2000, 335 pages.
Geijer-Lundin et al., "Uplink Load Estimation in WCDMA", Wireless Communications and Networking, IEEE, 2003, vol. 3, pp. 1669-1674.
English Translation—Decision on Grant, RU Patent Application No. 2009103759. English Translation—Notice of Ground for Rejection, JP Patent Application No. 2009-518036, Sep. 5, 2011.
Sato et al. "IEICE Technical Report", Japan, vol. 101, 541, Jan. 4, 2002, pp. 111-118.
Wigren, "Estimation of uplink WCDMA load in a single RBS", *IEEE Vehicular Technology Conference*, Oct. 3, 2007, pp. 1499-1503.

* cited by examiner

*Primary Examiner* — Temesgh Ghebretinsae
*Assistant Examiner* — Gennadiy Tsvey
(74) *Attorney, Agent, or Firm* — Myers Bigel Sibley & Sajovec, P.A.

(57) ABSTRACT

In a method of complexity reduced noise floor estimation in a wireless communications system, determining (S1), for a respective of at least a subset of a plurality of power grid points /c, a product of complementary cumulative distribution functions, each such function corresponding to a respective of a plurality j of provided wideband power measure estimates Ln a sliding window, and determining (S2), for each of said at least subset of power grid points, a probability distribution function of a minimum of said plurality of wideband power measure estimates based on said determined product.

16 Claims, 8 Drawing Sheets

METHOD AND ARRANGEMENT FOR NOISE FLOOR ESTIMATION

TECHNICAL FIELD

The present invention relates in general to methods and devices for load estimation in cellular communications systems and in particular to noise-floor estimation in wideband code division multiple access communication systems.

BACKGROUND

Wideband Code Division Multiple Access (WCDMA) telecommunication systems have many attractive properties that can be used for future development of telecommunication services. A specific technical challenge in e.g. WCDMA and similar systems is the scheduling of enhanced uplink channels to time intervals where the interference conditions are favourable, and where there exist a sufficient capacity in the uplink of the cell in question to support enhanced uplink channels. It is well known that existing users of the cell all contribute to the interference level in the uplink of WCDMA systems. Further, terminals in neighbour cells also contribute to the same interference level. This is because all users and common channels of a cell transmit in the same frequency band when CDMA technology is used. The load of the cell is directly related to the interference level of the same cell.

In order to retain stability of a cell, the load needs to be kept below a certain level. Several radio resource management (RRM) algorithms such as scheduling and admission control rely on accurate estimates of the uplink load. This follows since the majority of uplink user channels, at least in WCDMA, are subject to power control. This power control and RRM algorithms aim at keeping the received power level of each channel at a certain signal to interference ratio (SIR), in order to be able to meet specific service requirements. This SIR level is normally such that the received powers in the radio base station (RBS) are several dBs below the interference level. De-spreading in so called RAKE-receivers then enhance each channel to a signal level where the transmitted bits can be further processed, e.g. by channel decoders and speech codecs that are located later in the signal processing chain. The reader is referred to [1] for further details.

Since the RBS tries to keep each channel at its specific preferred SIR value, it may happen that an additional user, or bursty data traffic of an existing user, raises the interference level, thereby momentarily reducing the SIR for the other users. The response of the RBS is to command a power increase to all other users, something that increases the interference even more. Normally this process remains stable below a certain load level. In case a high capacity channel would suddenly appear, the raise in the interference becomes large and the risk for instability, a so called power rush, increases. This explains why it is a necessity to schedule high capacity uplink channels, like the enhanced uplink (E-UL) channel in WCDMA, so that one can insure that instability is avoided. In order to do so, the momentary load must be estimated in the RBS. This enables the assessment of the capacity margin that is left to the instability point.

The load of a cell in e.g. a CDMA system is usually referred to some quantity related to power, typically noise rise. A number of noise rise measures do exist. The most important one is perhaps the Rise over Thermal (RoT) that is defined as the quotient of the total interference of the cell and the thermal noise power floor of the receiver of the RBS. Other measures include e.g. in-band non-WCDMA interference with respect to the thermal noise floor. Consequently, power quantities, such as total power level and noise floor (ideally thermal noise floor), have to be determined. Determinations of noise floor are typically associated with relatively large uncertainties, which even may be in the same order of magnitude as the entire available capacity margin. This is particularly true when only measurements of total received power are available. It will thus be very difficult indeed to implement e.g. enhanced uplink channel functionality without improving the load estimation connected thereto.

It could furthermore be mentioned that an equally important parameter that requires load estimation for its control, is the coverage of the cell. The coverage is normally related to a specific service that needs to operate at a specific SIR to function normally. The uplink cell boundary is then defined by a terminal that operates at maximum output power. The maximum received channel power in the RBS is defined by the maximum power of the terminal and the pathloss to the digital receiver. Since the pathloss is a direct function of the distance between the terminal and the RBS, a maximum distance from the RBS results. This distance, taken in all directions from the RBS, defines the coverage.

It now follows that any increase of the interference level results in a reduced SIR that cannot be compensated for by an increased terminal power. As a consequence, the pathloss needs to be reduced to maintain the service. This means that the terminal needs to move closer to the RBS, i.e. the coverage of the cell is reduced.

From the above discussion it is clear that in order to maintain the cell coverage that the operator has planned for, it is necessary to keep the interference below a specific level. This means that load estimation is important also for coverage. In particular load estimation is important from a coverage point of view in the fast scheduling of enhanced uplink traffic in the RBS. Furthermore, the admission control and congestion control functionality in the radio network controller (RNC) that controls a number of RBSs also benefits from accurate information on the momentary noise rise of the cell.

All above mentioned noise rise measures have in common that they rely on accurate estimates of the background noise. Therefore, there is a need for methods and arrangements for providing an efficient and accurate real time estimates for the background noise.

SUMMARY

A general problem with prior art CDMA communications networks is that load estimations are presented with an accuracy which makes careful load control difficult. In particular, determination of noise rise suffers from significant uncertainties, primarily caused by difficulties to estimate the noise floor.

A general object of the present invention is to provide improved methods and arrangements for determining power-related quantities, e.g. load estimation.

A further object of the present invention is to provide methods and arrangements giving opportunities for more accurate determination of noise related quantities, e.g. noise floor power estimates.

These and other objects are achieved in accordance with the attached set of claims.

According to a basic aspect the invention comprises a method of complexity reduced noise floor power estimation in a wireless communications system by determining (S1), for a respective of a subset of multiple power grid points k, a product of complementary cumulative distribution functions, each such complementary cumulative distribution function corresponding to a respective of a plurality j of provided wideband power measure estimates in a sliding window, and determining (S2), for each subset of power grid points, a probability distribution function of a minimum of the wideband power measure estimates based on the determined product.

An advantage of the present invention comprises a reduction of the computational complexity, thereby enabling accurate real time noise floor estimation.

BRIEF DESCRIPTION OF THE DRAWINGS

The invention, together with further objects and advantages thereof, may best be understood by referring to the following description taken together with the accompanying drawings, in which:

FIG. 4b is a diagram of a selected power grid interval of the diagram of FIG. 4a;

FIG. 5b is a diagram of a selected power grid interval of the diagram of FIG. 5a;

FIG. 6b is a diagram of a selected power grid interval of the diagram of FIG. 6a;

ABBREVIATIONS

Figure 1:
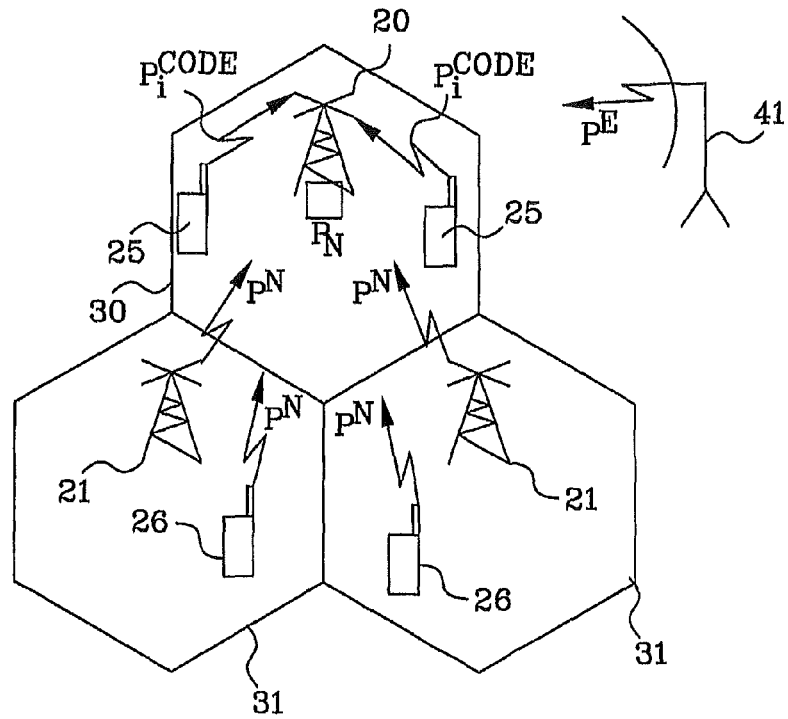
FIG. 1 is a schematic illustration of signal powers occurring in a typical system in which the present invention can be implemented

E-UL Enhanced Up Link
RBS Radio Base Station
RNC Radio Network Controller
RoT Rise over Thermal
RRM Radio Resource Management
SIR Signal to Interference Ratio
WCDMA Wideband Code Division Multiple Access

DETAILED DESCRIPTION

The present detailed description is introduced by a somewhat deeper discussion about how to perform noise floor estimation and the problems encountered by a plurality of possible solutions, in order to reveal the seriousness thereof. This is done with reference to but not limited to a typical WCDMA system; the ideas of the present invention are equally applicable to many types of cellular systems where accurate noise floor power estimations are necessary but difficult to provide.

Reference and Measurement Points

In a typical signal chain of a RBS a received wideband signal from an antenna first passes an analogue signal conditioning chain, which consists of cables, filters etc. Variations among components together with temperature drift, render the scale factor of this part of the system to be undetermined with about 2-3 dBs, when the signal enters a receiver. This is discussed further below. In the receiver, a number of operations take place. For load estimation it is normally assumed that a total received wideband power is measured at some stage. Furthermore, it is assumed in this description that code power measurements, i.e. powers of each individual channel/user of the cell, are made available at another stage.

There are several reasons for the difficulties to estimate the thermal noise floor power. One reason as indicated above is that the thermal noise floor power, as well as the other received powers, is affected by component uncertainties in the analogue receiver front end. The signal reference points are, by definition, at the antenna connector. The measurements are however obtained after the analogue signal conditioning chain, in the digital receiver. These uncertainties also possess a thermal drift.

The analogue signal conditioning electronics chain does introduce a scale factor error of 2-3 dB between RBSs (batch) that is difficult to compensate for. The RTWP (Received Total Wideband Power) measurement that is divided by the default value of the thermal noise power floor may therefore be inconsistent with the assumed thermal noise power floor by 2-3 dB. The effect would be a noise rise estimate that is also wrong by 2-3 dB. Considering the fact that the allowed noise rise interval in a WCDMA system is typically 0-7 dB, an error of 2-3 dB is not acceptable.

Fortunately, all powers forming the total received power (c.f. Appendix A) are equally affected by the scale factor error $\gamma(t)$ so when the noise rise ratio $N_R(t)$ (cf. Appendix A) is calculated, the scale factor error is cancelled as $$N_R(t) = N_R^{Digital\ Receiver}(t) = \frac{P^{Total,Digital\ Receiver}(t)}{P_N^{Digital\ Receiver}} = \frac{\gamma(t)P^{Total,Antenna}(t)}{\gamma(t)P_N^{Antenna}} = \frac{P^{Total,Antenna}(t)}{P_N^{Antenna}} = N_R^{Antenna}(t) \quad (1)$$

where $N_R^{DigitalReceiver}(t)$ and $N_R^{Antenna}(t)$ are the noise rise ratios as measured at the digital receiver and at the antenna, respectively, $P^{Total,DigitalReceiver}(t)$ and $P^{Total,Antenna}(t)$ are the total received powers at the digital receiver and the antenna, respectively, and $P_N^{DigitalReciver}$ and $P_N^{Antenna}$ are the thermal noise level as measured at the digital receiver and the antenna, respectively. However, note that Equation (1) requires measurement of the noise floor $P_N^{DigitalReceiver}$ in the digital receiver.

Noise Floor

As indicated in the background section, the result of introducing additional channels becomes an increase in the total power. Noise rise $N_R$ defined as a ratio between a total power measure i.e. total wideband power measure, and a thermal noise level $P_N$ measured at an antenna connector, also referred to as the noise floor, is a measure of the load in the system. Above a noise rise threshold $N_R^{thr}$ the situation may become unstable. A relation between a total bit rate and a noise rise is known from the design of power control loops and scheduling of additional channels can be performed once the instantaneous noise rise $N_R$ has been determined. The pole capacity, $C_{pole}$ denotes the maximal bitrate capacity in bits per second. A typical difference $\Delta N$ between the threshold $N_R^{thr}$ and the level defined by thermal noise level $P_N$ is typically about 7-10 dB. However, the noise floor or thermal noise level $P_N$ is not readily available. For instance, since scale factor uncertainties in the receiver may be as large as 2-3 dB as discussed above, a large part of the available margin is affected by such introduced uncertainties.

Observability of the Noise Floor

One reason for the difficulties to estimate the thermal noise floor power now appears, since even if all measurements are made in the digital receiver, the noise floor cannot be directly measured, at least not in a single RBS. The explanation is that neighbor cell interference and interference from external sources also affect the receiver, and any mean value of such sources cannot be separated from the noise floor. Power measurements in the own cell channels may in some cases be performed. Such measurements do however not solve the entire problem, although they may improve the situation somewhat.

FIG. 1 illustrates various contributions to power measurements in connection with an arbitrary radio base station (RBS) 20. The RBS 20 is associated with a cell 30. Within the cell 30 a number of mobile terminals 25 are present, which communicate with the RBS 20 over different links, each contributing to the total received power by $P_i^{Code}(t)$. The cell 30 has a number of neighboring cells 31 within the same WCDMA system, each associated with a respective RBS 21. The neighboring cells 31 also comprise mobile terminals 26. The mobile terminals 26 emit radio frequency power and the sum of all contributions is denoted by $P^N$. There may also be other network external sources of radiation, such as e.g. a radar station 41. $P^E$ denotes contributions from such external sources. Finally, the $P_N$ term arises from the receiver itself.

It is clear from the above that $P^N(t)$ and $P_N$ are not measurable and hence need to be estimated. The situation becomes even worse if only measurements of total wide band power are available. Total wide band power measurements $P_{Measurements}^{Total}(t)$ can be expressed according to:

$$P_{Measurements}^{total}(t) = \sum_{i=1}^{n} P_i^{Code}(t) + P^{E+N}(t) + P_N(t) + e^{Total}(t) \quad (2)$$

where $$P^{E+N} = P^E + P^N \quad (3)$$

and where $e^{Total}(t)$ models measurements noise.

It can be mathematically proven that a linear estimation of $P^{E+N}(t)$ and $P_N$ is not an observable entity. Only the quantity $P^{E+N}(t)+P_N$ is observable from available measurements. This is true even in the case code power measurements are performed. The problem is that there is no conventional technique that can be used to separate the noise floor from power mean values originating from neighbor cell interference and in-band interference sources external to the cellular system. Furthermore, if only measurements of total received wide band power is available, also the mean values of the individual code power contributions are indistinguishable from the other contributions to the total power mean value.

Noise Floor Estimation

Yet another reason for the difficulty with noise rise estimation is that the thermal noise floor is not always the sought quantity. There are situations where constant in-band interference significantly affects the receiver of the RBS. These constant interferers do not affect the stability discussed above; they rather appear as an increased noise temperature i.e. an increased thermal noise floor.

A possible solution is to use costly and individual determination of the thermal noise floor of each RBS in the field, in order to achieve a high enough load estimation performance.

The establishment of the default value for the thermal noise power floor, as seen in the digital receiver requires reference measurements performed over a large number of RBSs either in the factory or in the field. Both alternatives are costly and need to be repeated as soon as the hardware changes.

The above approach to solve the problem would require calibration of each RBS individually. This would however be very costly and is extremely unattractive. Furthermore, temperature drift errors in the analogue signal conditioning electronics of perhaps 0.7-1.0 dB would still remain.

Another potential approach would be to provide an estimation of the thermal noise power floor. One principle for estimation of the thermal noise power floor is to estimate it as a minimum of a measured or estimated power quantity comprising the thermal noise floor. This minimum is typically computed over a pre-determined interval in time. If no code power measurements are available, the power in question is the total received wideband power. One approach would therefore be to calculate the noise rise as a division of the momentary total received wideband power with an established thermal noise floor power estimated as a minimum of the total received wideband power over a pre-determined interval of time.

It is a well known fact that the thermal noise floor contribution always is present, and consequently it can be concluded that if measurement uncertainties are neglected, the noise floor contribution has to be equal to or smaller than the minimum value of the total received wideband power received within a certain period of time. In essence, the minimum value of the total wideband power within a certain time interval constitutes an upper limit of the unknown noise floor.

A possible solution according to the above discussion could provide a hard algorithm for estimation of the thermal noise power floor, in the sense that a hard minimum value is computed over a sliding window, and used as an estimate of the thermal noise power floor. Consequently, the noise floor could be determined as the minimum value (over a selected interval of time) of either of the following:

The sum of the power of the noise floor and the power of neighbor and external interference.

The total received wideband power.

The noise rise is then subsequently calculated from one of the above two quantities, by a division of the total received wideband power with the established thermal noise floor power.

Figure 2:
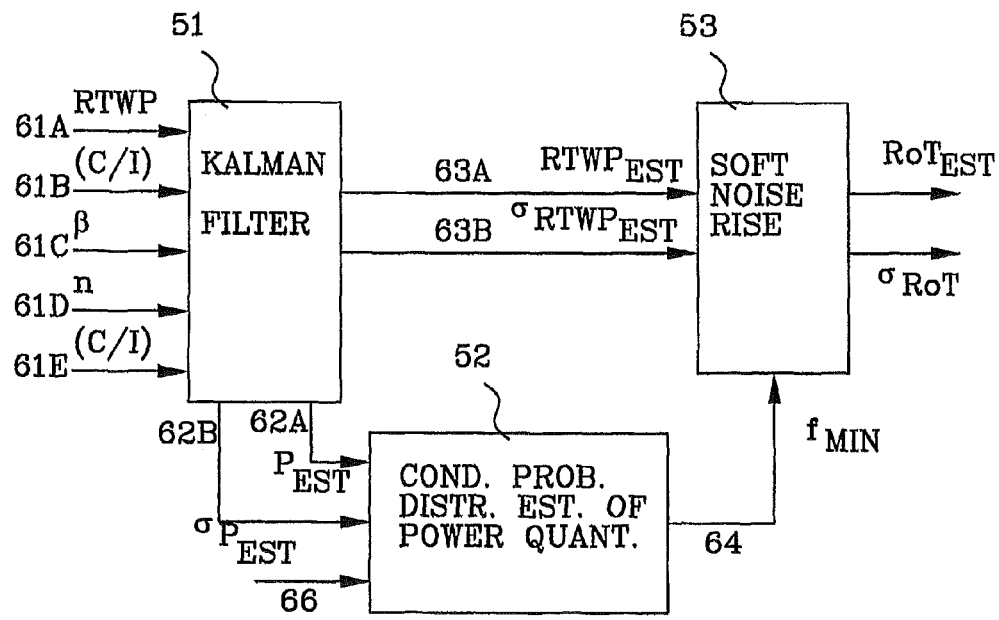
FIG. 2 is a schematic illustration of functionalities of possible solutions.

With reference to FIG. 2, another possible solution provides a different principle, based on soft estimation of the thermal noise power floor and the noise rise. In the most advanced form, the possible noise rise estimation is performed in three main blocks.

The first block 51. i.e. power estimation block, applies a so called Kalman filter for estimation of certain power quantities that are needed by subsequent processing blocks. Specifically, the block 51 receives a number of inputs 61A-E comprising the measured received total wideband power (RTWP) 61A, measured code power to interference ratio (C/I) of channel i 61B, beta factors for channel i 61C, number of codes for channel i 61D, corresponding code power to interference ratio commanded by a fast power control loop 61E, and provides outputs comprising power estimates 62A, 63A and corresponding standard deviations 62B, 63B. The output 62A is the estimate of a power quantity being the sum of neighbor cell WCDMA interference power, in-band non-WCDMA interference power and thermal noise floor power, and the output 63A is the estimated received total wideband power and the output 63B is the corresponding variance. Since the outputs are from the Kalman filter arrangement, these parameters are the only ones needed to define the estimated Gaussian distributions that are produced by the filter. Thus, enough information is given to define the entire probability distribution information of the power estimates.

The second block 52 applies Bayesian estimation techniques in order to compute a conditional probability density function of the minimum of one of the above mentioned power quantities. The minimum also accounts (by Bayesian methods) for the prior distribution of the thermal noise power floor, thereby improving the average performance of the estimation, when evaluated over an ensemble of RBSs. The actual value of the noise floor can also be calculated by a calculation of the mean value of the estimated conditional probability distribution function. Specifically, the block 52 receives the power estimate 62A and the corresponding standard deviations 62B as inputs, and provides an output 64 comprising the estimated probability distribution of an extreme value, typically the minimum, of $P_{Estimate}^{E+N+Noise}$, which is an estimate of the sum of neighbor cell interference power, external inband interference power and thermal noise power. Parameters 66 giving information about a prior expected probability distribution of the noise floor power is provided to the conditional probability distribution estimation block 52, in order to achieve an optimal estimation.

A more detailed description of the estimation of the conditional probability distribution for the interested reader is given in Appendix B.

The third block 53 performs soft noise rise estimation by a calculation of the conditional probability distribution of the quotient of the momentary estimated wide band power probability distribution, and the conditional probability distribution of the noise power floor. The noise rise estimate is computed as a conditional mean. The details are omitted here.

Figure 3:
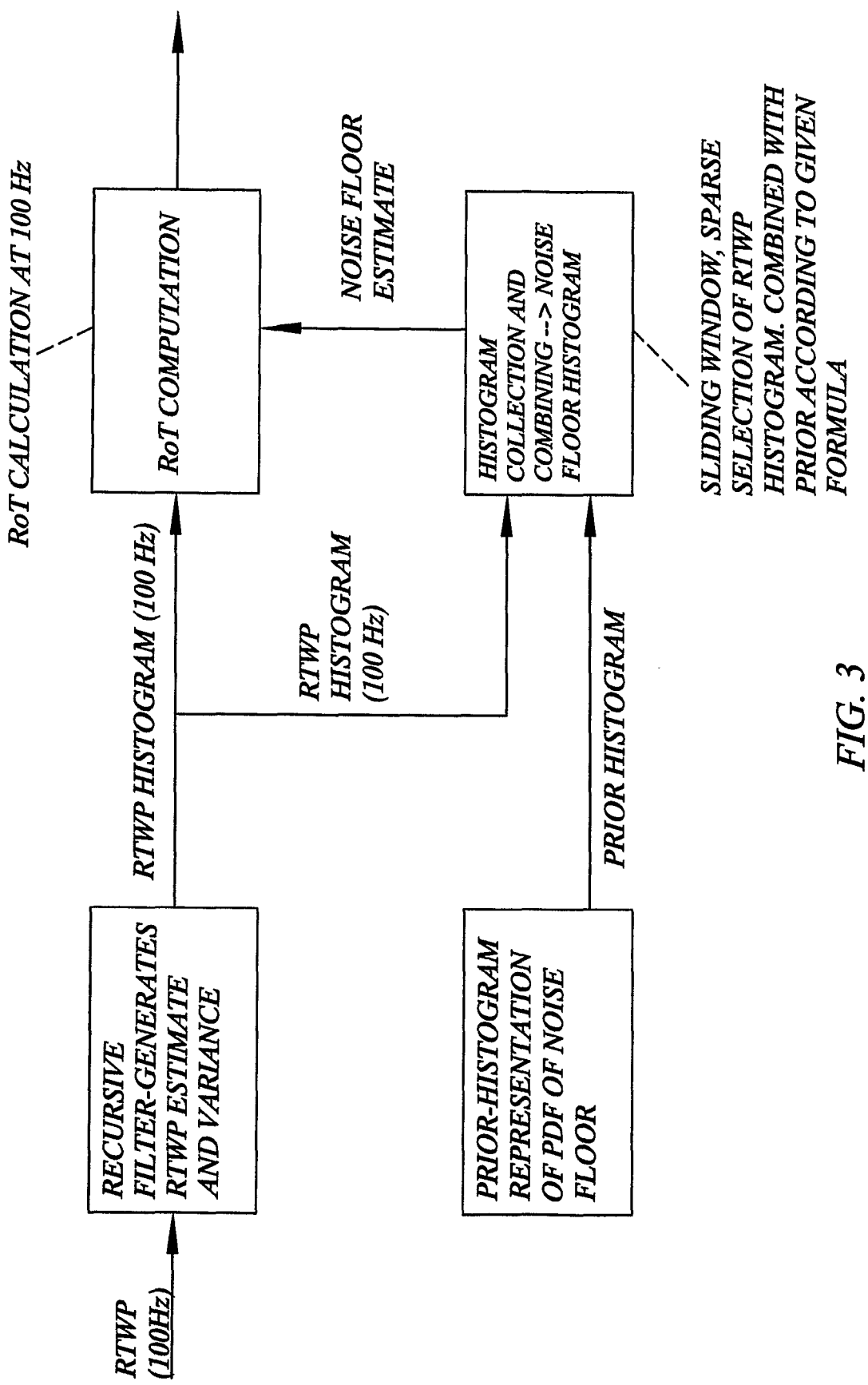
FIG. 3 is a schematic illustration of functionalities of another possible solution.

Finally, with reference to FIG. 3, a modified version of the previously described possible method discloses using a simplified soft solution. Only the RTWP is measured and a simplified algorithm for RoT estimation is applied. The simplified algorithm accordingly applies a simplified, one-dimensional Kalman filter for estimation of the RTWP and the corresponding variance. The reason why this filtering step is used is that the subsequent (still soft) processing blocks require probability distributions as input. These are best generated by a Kalman filter in the first processing block, corresponding to block 51 of the previously described method.

Subsequently the thermal noise power floor is estimated with the complete soft algorithm, as described with reference to FIG. 2. Contrary to that previously described possible method, an (optimal) estimated value of the thermal noise power floor is calculated. Finally, the last processing block divides the estimated RTWP by the value of the thermal noise power floor, to obtain an estimate of the RoT. Note that this final step is not performed by a soft algorithm.

The estimation of cell load in terms of rise over thermal (RoT, one of several noise rise measures) is a critical component in that this provides an input to an enhanced uplink scheduler function of the RBS. FIG. 2 and FIG. 3 illustrate possible algorithms for soft estimation of RoT. Notice that the noise floor estimation is performed by the same algorithm for these two cases. During the implementation of a target C++ code in the RBS, problems with unexpectedly low computer capacity in terms of floating point operations per second, and memory capacity were encountered.

Therefore, there is a definite need for methods and arrangements enabling complexity reduction measures in order to make it possible to perform the above discussed soft noise floor estimation in real time.

In essence the present invention deals with complexity reductions of the method in the previously described second block 52 i.e. the soft noise power floor estimator. Due to the above mentioned problems, it was recognized that the computational complexity of the soft algorithm for the estimation of the RoT needed to be reduced significantly to enable real time execution on an allocated computer board.

To enable the complexity reduction a plurality of potential measures and goals where identified and dealt with. The measures have the advantages of, if implemented together in an optimal manner, enabling the following:

Reduction the computational complexity by more than 95%, without losing any performance.

Allowing multiple instances of the algorithm to run in parallel on the computer board.

All complexity reduction measures affect the implementation of the thermal noise floor estimation part of the RoT estimator. However, they are also useful for future refinements of the final RoT calculation block, in case this block would be modified to implement a soft algorithm.

To further define the field for the present invention, problems with the previously described possible methods and algorithms will be described. For detailed theoretical and mathematical information, the reader is advised to read the attached Appendix A-F.

The first problem was due to the computation of the probability distribution function of the minimum of a number of power measure estimates (obtainable from the previously described Kalman filter block 51). This computation, according to one possible solution, is performed as follows:

$$f_{min}(P_k) = \sum_{i=1}^{N_{PowerSamples}} \left( f_{PowerSample}(i,k) \prod_{\substack{j=1 \\ j \neq i}}^{N_{PowerSamples}} (1 - F_{PowerSample}(j,k)) \right), \quad (4)$$

$$k = 1, \ldots, N_{GridPoints}.$$

For the interested reader the complete derivation of the Equation (4) is included in Appendix B. However, the actual derivation is not of particular interest here or a part of the invention as such.

To explain the above expression it is noted that $f_{min}(P_k)$, $k=1, \ldots N_{GridPoints}$ is a discretized version (i.e. a histogram) of a sought probability distribution function of the minimum of the power distributions in a sliding window. The discretization is performed on a power grid, $P_k$, $k=1, \ldots, N_{GridPoints}$, where $N_{GridPoints}$ denotes the number of power grid points. In known implementations, the power grid covers the range −120 dBm-−70 dBm, typically in steps of 0.2 dB. Furthermore, $f_{PowerSample}(i,k)$, $i=1 \ldots, N_{PowerSamples}$, denote the probability distribution functions of the incoming (from the recursive estimation block of FIG. 2, i.e. Kalman filter 51) estimates of the wideband power measure that is the basis for the noise floor estimation block. Since Kalman filtering is normally applied in the recursive estimation block 51, $f_{PowerSample}(i,k)$ is normally a discretized (over the index k) Gaussian distribution function. Similarly $F_{PowerSample}(i,k)$ is a discretized cumulative distribution function corresponding to $f_{PowerSample}(i,k)$. When $f_{PowerSample}(i,k)$ is Gaussian $F_{PowerSample}(i,k)$ can be expressed in terms of the complementary error function. Finally note again that in the possible solution the discretized power distributions $f_{PowerSample}(i,k)$ and $F_{PowerSample}(i,k)$ correspond to estimated power quantities (from the recursive estimation block) that fall within a sliding window in time. Not all estimated power samples need to be used in the above formula, a sub-sampling is normally applied.

The above background is sufficient to explain the first problem at hand. Studying the structure of the above formula, it is seen that a straight forward implementation of the Equation (4) requires executing:

a first outer for-loop over the index k (the power grid points).
a second loop over the index i (the samples of the sliding window), to implement the sum.
an additional inner third loop over the index j (the samples of the sliding window) to implement the product.

The result is hence a triple loop structure—something that results in a large number of calculations and in fact turned out to be too complex for the computer board at hand.

The second problem with known methods is derivable from that fact that in order to cover all possible cases a wide power grid range is needed for the power discretization grid. In above described possible solutions, as mentioned previously, the range is −120 dBm--−70 dBm in order to cover a wide range of configurations and background interference situations. Consequently, the two inner loops of Equation (4) (over index i and over index j) above will both need to be run over a vast range of power grid points with index k. This means that the computational burden will also be increased, as compared to the case where a smaller value of $N_{GridPoints}$ is used.

The third problem with the possible solutions is that, as stated above, the discretized probability functions $f_{PowerSample}(i,k)$ corresponding to each power sample of the sliding window is typically Gaussian. The consequence is that an evaluation of the exponential function needs to be performed repeatedly when the result of the above formula is computed. Unfortunately, the exponential function is a transcendental function that may require much more computing time than e.g. floating-point multiplications. The same is true for the complementary error function, that is used to express $F_{PowerSample}(i,k)$. Together, these function evaluations turned out to significantly increase the computational load.

Finally, for the described possible solution, with reference to FIG. 3, the RBS in the system is configured to handle up to four receiver branches (per computer board). For various reasons it has been decided or standardized that RoT estimation shall be performed before power combining. The consequence is a staggering four-fold increase in the computational load. In addition, this problem needed treatment in order to allow for real time execution on the computer board.

In order to solve the above mentioned problems, multiple measures have been identified by the inventor.

An embodiment of a method according to the invention comprise utilizing the structure of the Equation (4) above, the shape of the probability distribution function $f_{PowerSample}(i,k)$ as well as the shapes of the quantized cumulative distribution function $F_{PowerSample}(i,k)$ and the product over complementary cumulative distribution functions $$\prod_{j=1}^{N_{PowerSamples}} (1 - F_{PowerSample}(j,k)).$$

in order to reduce the computational complexity. The different quantities are further illustrated with reference to the plots of FIGS. 4a-b, 5a-b and 6a-b.

Figure 7:
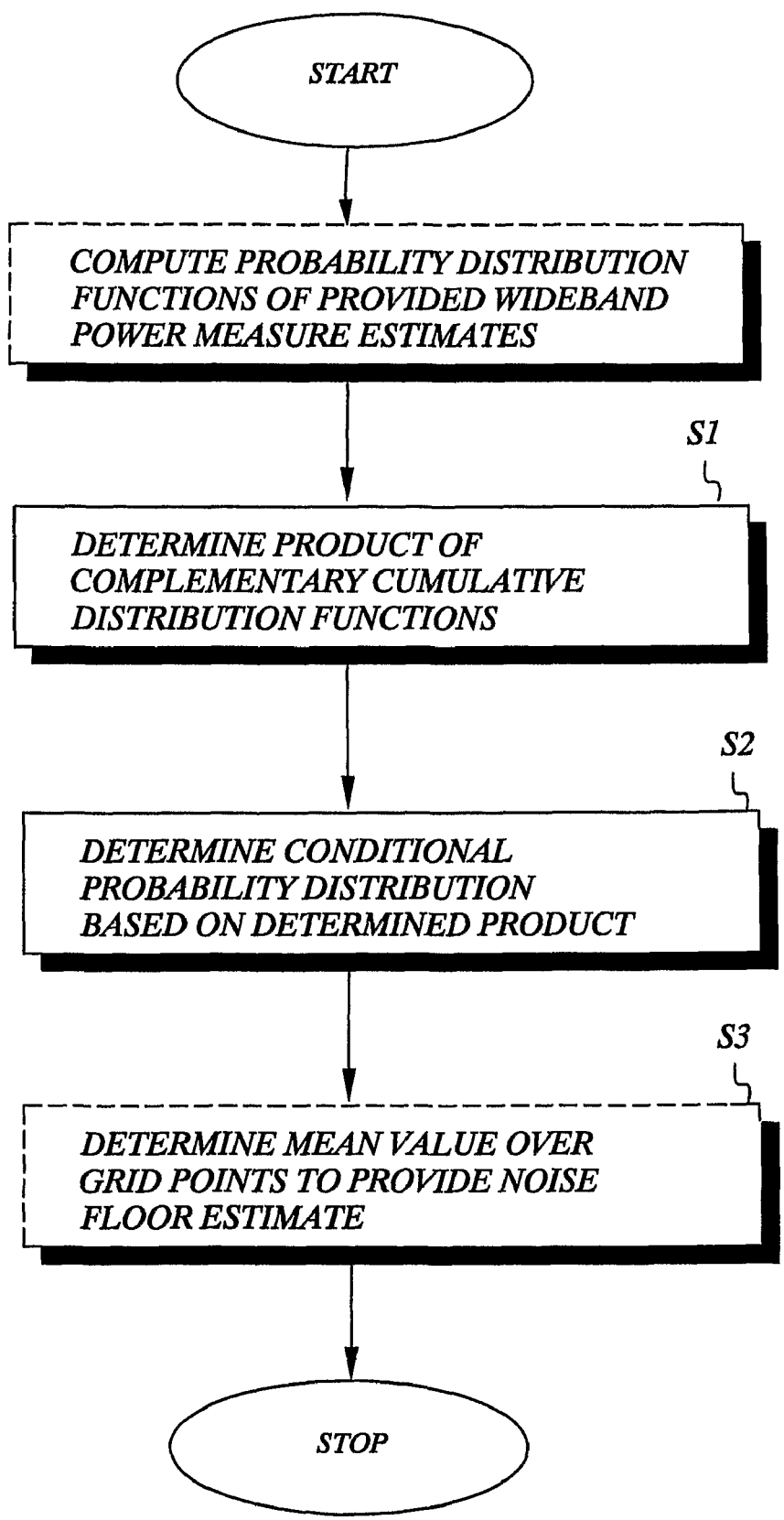
FIG. 7 is a schematic flow chart of an embodiment of a method according to the invention.

Basically, with reference to FIG. 7, an embodiment of the present invention comprises a method of complexity reduced noise floor estimation in a wireless communications system The method comprises first determining (S1), for a respective of a subset of a plurality of power grid points $P_k$, a product of complementary cumulative distribution functions, each such function corresponding to a respective of a plurality j of provided wideband power measure estimates in a sliding window. Secondly, determining (S2), for each subset of power grid points $P_k$, a probability distribution function of a minimum of the plurality of wideband power measure estimates based on said determined product.

Specifically, this can be shown by studying the Equation (4) and identifying that since the product over the complementary cumulative distribution functions $$\prod_{\substack{j=1 \\ j \neq i}}^{N_{PowerSamples}} (1 - F_{PowerSample}(j,k))$$

is a product over all indices j except index i it can be rewritten by dividing away the factor $1-F_{PowerSample}(i,k)$ according to the following:

$$\prod_{\substack{j=1 \\ j \neq i}}^{N_{PowerSamples}} (1 - F_{PowerSample}(j,k)) = \frac{1}{1 - F_{PowerSample}(i,k)} \prod_{j=1}^{N_{PowerSample}} (1 - F_{PowerSample}(j,k)) \quad (5)$$

Consequently the probability distribution function of the minimum of the plurality of wideband power measure estimates based on said determined product is determined (S2) according to the following complexity reduced expression, Equation (6):

$$f_{min}(P_k) = \sum_{i=1}^{N_{PowerSamples}} \left( f_{PowerSample}(i,k) \prod_{\substack{j=1 \\ j \neq i}}^{N_{PowerSamples}} (1 - F_{PowerSample}(j,k)) \right) = \sum_{i=1}^{N_{PowerSamples}} \left( \frac{f_{PowerSample}(i,k)}{1 - F_{PowerSample}(i,k)} \prod_{j=1}^{N_{PowerSample}} (1 - F_{PowerSample}(j,k)) \right), \quad (6)$$

$$k = 1, \ldots, N_{GridPoints}$$

According to a specific embodiment, it is more efficient to first compute (S1) the above mentioned product of complementary cumulative distribution functions, here for simplicity denoted cdfTest(k)

$$cdfTest(k) = \prod_{j=1}^{N_{PowerSample}} (1 - F_{PowerSample}(j, k)), \quad (7)$$

$$k = 1, \ldots, N_{GridPoints}$$

The calculation of the Equation (7) then requires one outer loop over the grid points (k) and an inner loop over the sliding window samples (j).

The sought quantity is then computed (S2) as $$f_{min}(P_k) = \sum_{i=1}^{N_{PowerSamples}} \left( \frac{f_{PowerSample}(i, k)}{1 - F_{PowerSample}(i, k)} cdfTest(k) \right), \quad (8)$$

$$k = 1, \ldots, N_{GridPoints}$$

This latter step requires an outer loop over the grid points (k) and one inner loop over the sliding window (i).

In summary, the computations have been reduced from one set of for loops nested to depth 3 for Equation (4), to two sets of for loops, each set nested to depth 2 for Equation (8). Although some excess operations are introduced, the net effect is removal of one for loop over $N_{PowerSample}$ iterations. The complexity reduction, when it comes to evaluate $f_{min}(P_k)$, k=1 ... $N_{GridPoints}$, is of the order $N_{PowerSample}/2$. In a typical implementation, the complexity reduction may be a factor 20-30. An example showing a portion of a target C++ code is given in the attached Appendix C.

Figure 8:
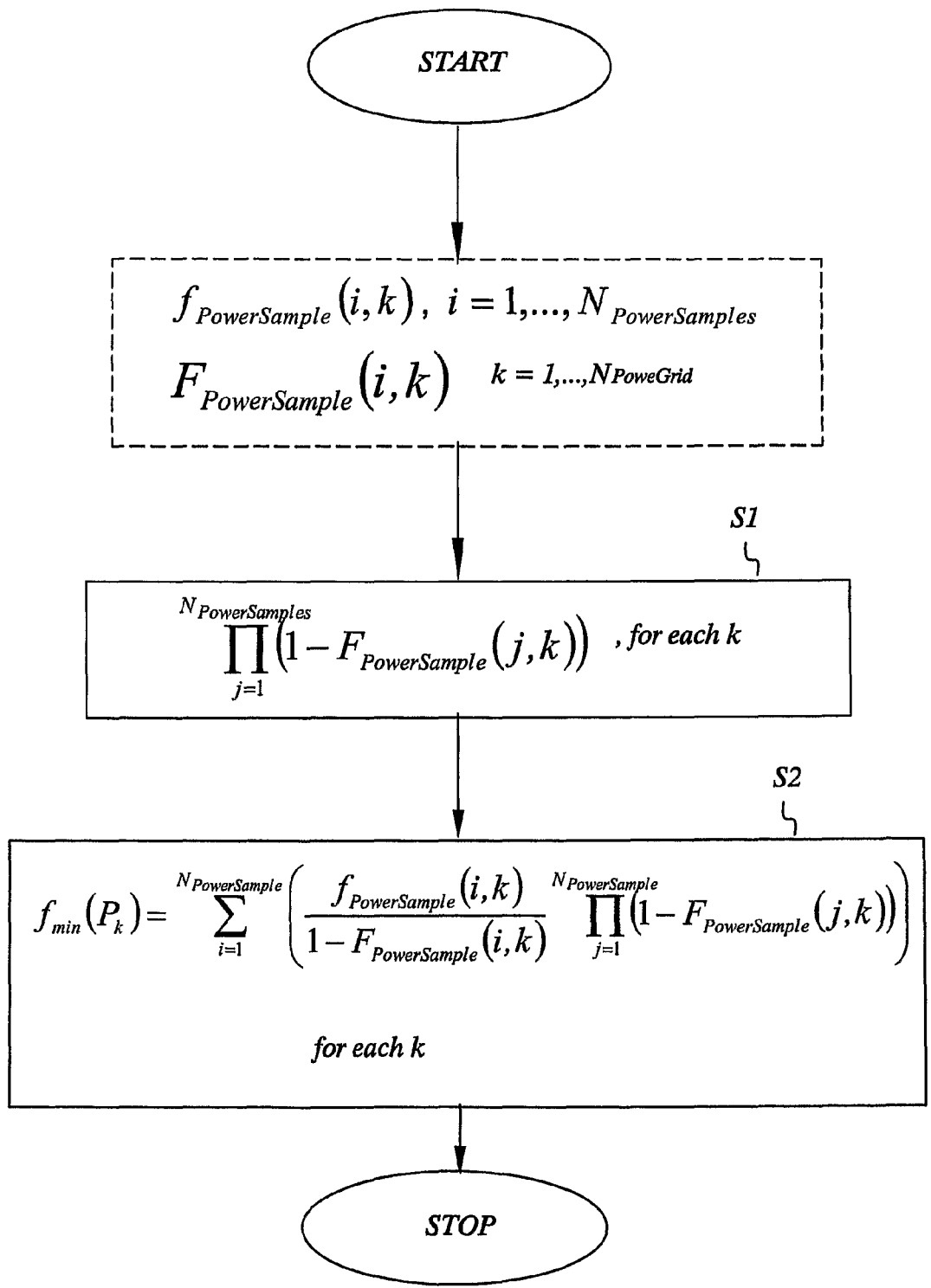
FIG. 8 is a schematic flow chart of an embodiment of a method according to the invention.

A further embodiment of the method according to the invention is illustrated by FIG. 8.

Figure 4A:
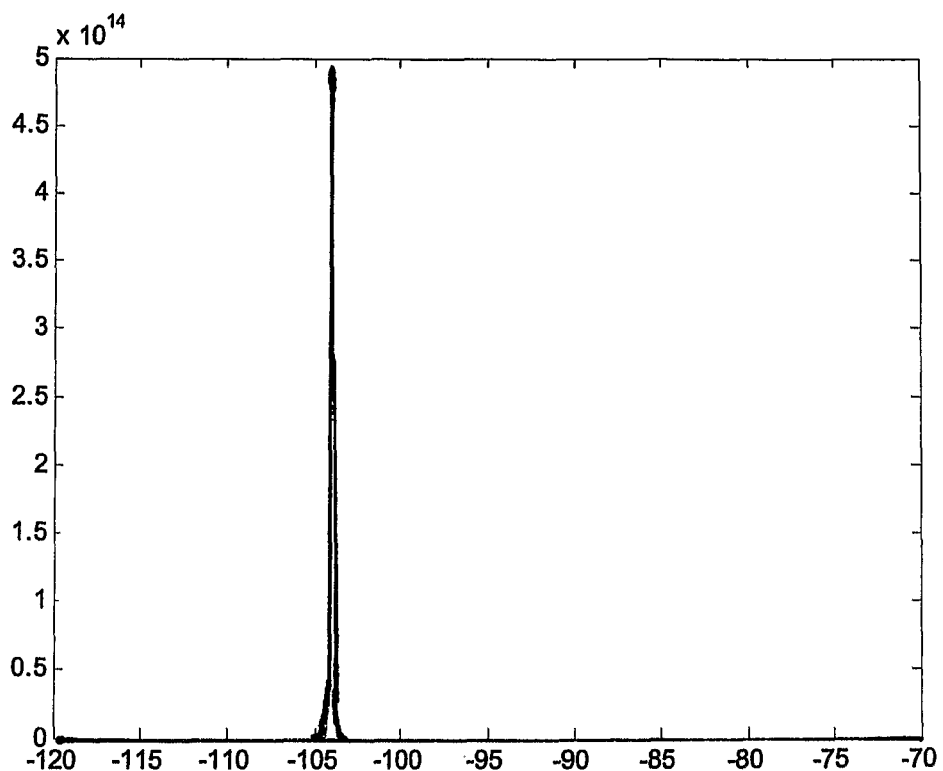
FIG. 4a is a diagram showing a probability distribution function according to the invention.
Figure 4B:
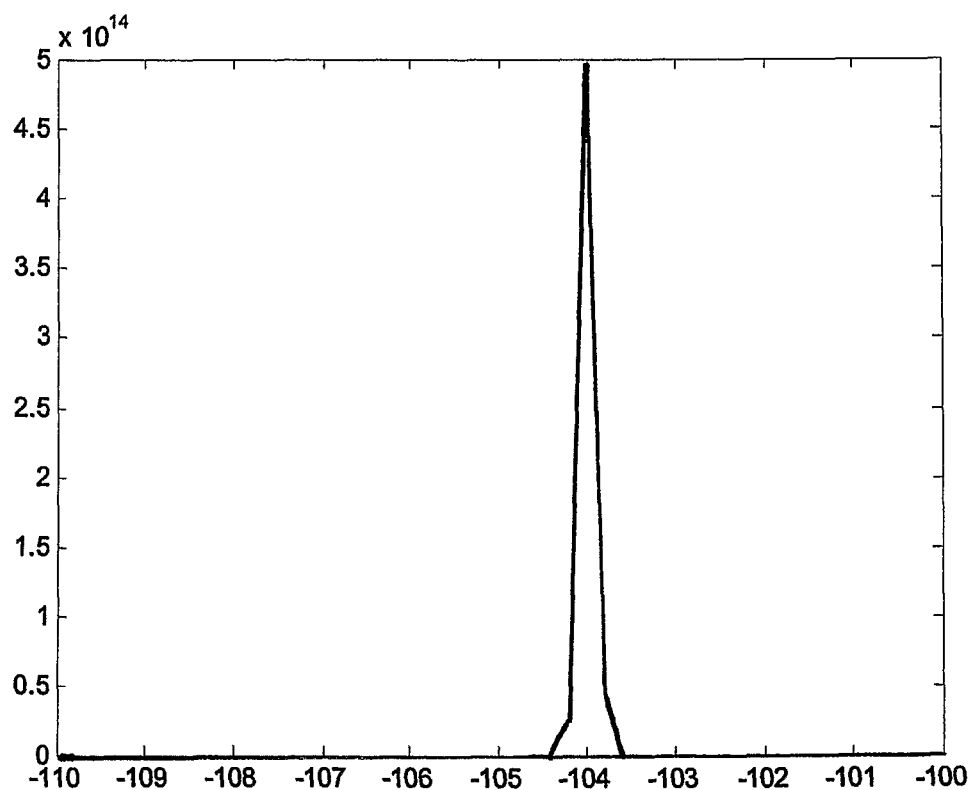
Figure 5A:
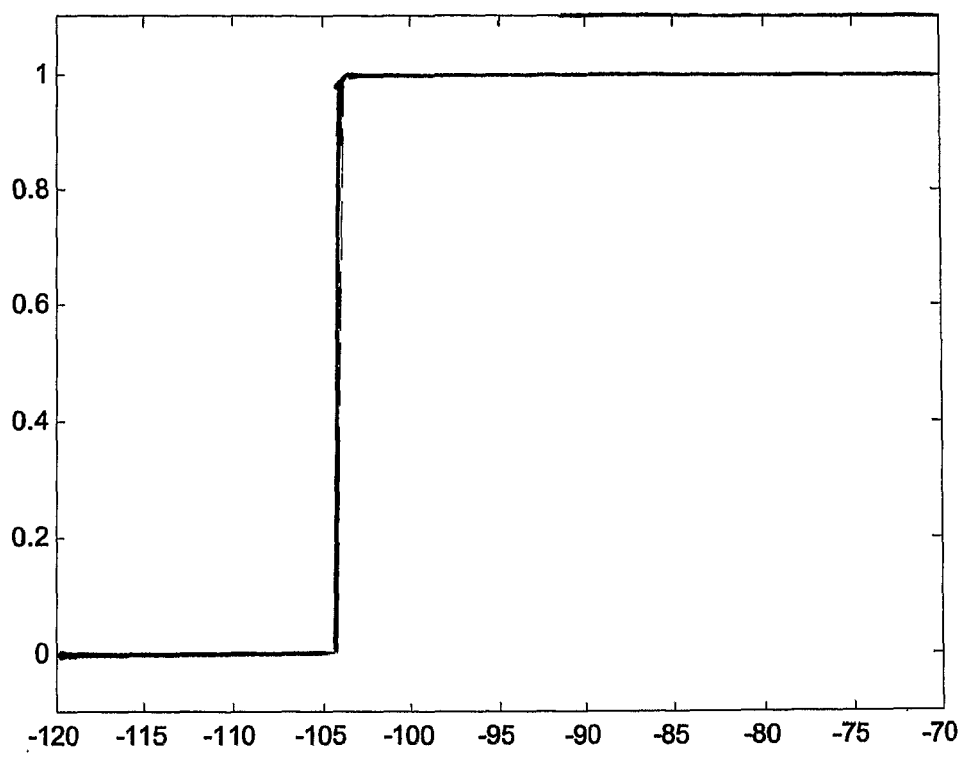
FIG. 5a is a diagram showing a quantized cumulative distribution function according to the invention.
Figure 5B:
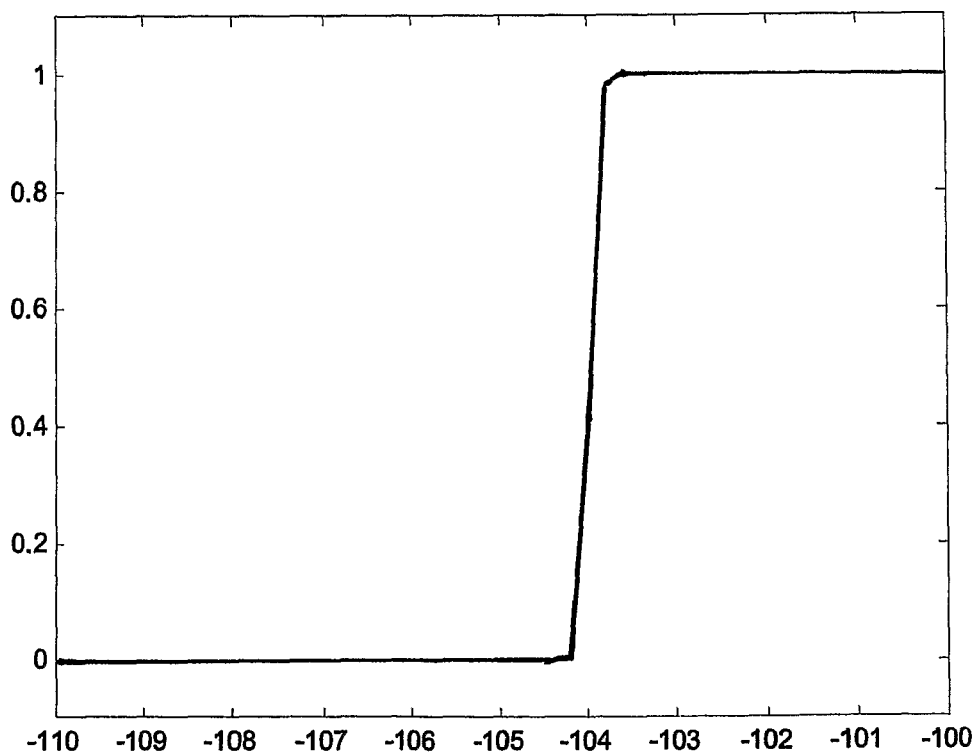
Figure 6A:
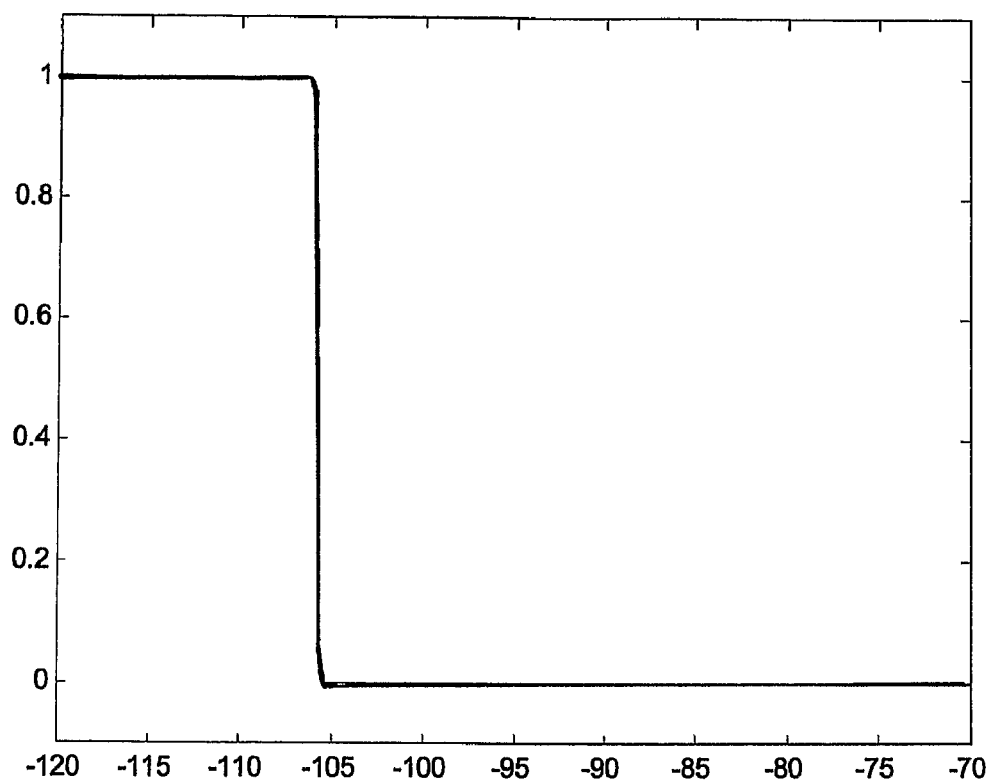
FIG. 6a is a diagram of a product of a complementary cumulative distribution function according to the invention.
Figure 6B:
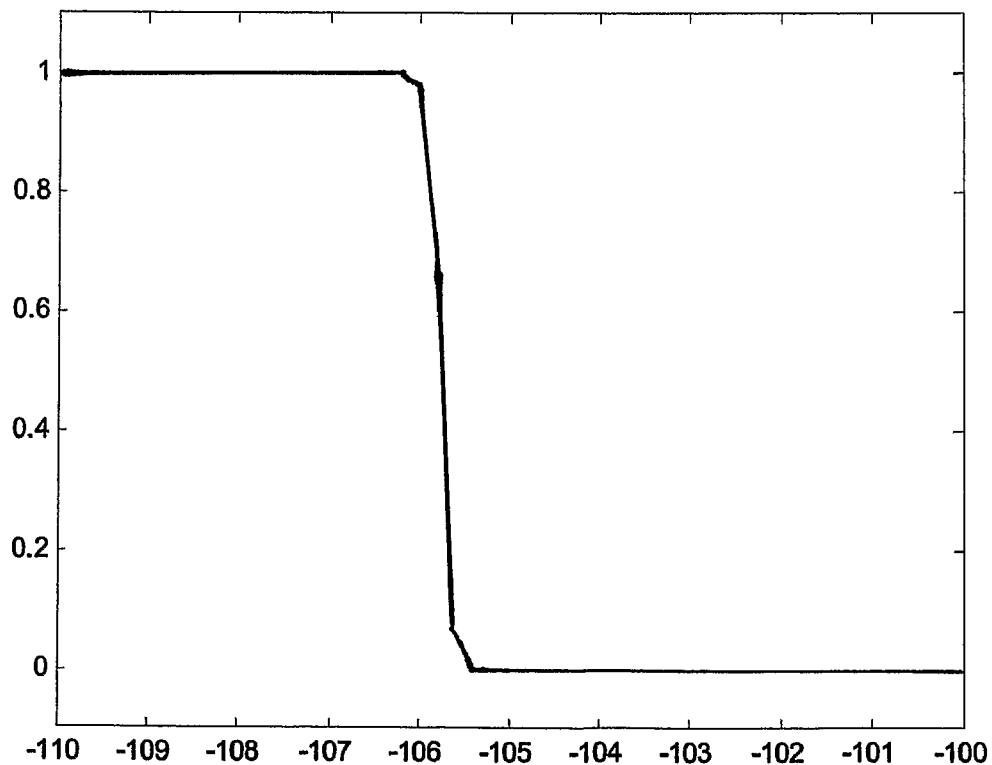

According to a specific embodiment relating to the solution to the second described problem, a further analysis of the graphs in FIGS. 4a-6b is necessary. As is evident from FIGS. 4a-b, the probability distribution function $f_{PowerSample}(i,k)$ is very close to zero for the majority of the range of the power discretization. Noting that all quantities of the product in the formula $$f_{min}(P_k) = \quad (9)$$

$$\sum_{i=1}^{N_{PowerSamples}} \left( f_{PowerSample}(i, k) \prod_{\substack{j=1 \\ j \neq i}}^{N_{PowerSamples}} (1 - F_{PowerSample}(j, k)) \right),$$

take values between 0 and 1 it is recognized that power grid indices k sufficiently far away from the peak of FIG. 4a-b, will not contribute to the end result of the above formula as represented by Equation (9), as compared to values close to the peak. According to a specific embodiment of the invention, such values are set to zero. The advantage is that such values give zero contributions to the sum of the above formula—hence the corresponding indices can be removed from the calculation of the sum. As seen by the typical shapes of FIGS. 4a-b, the saving is substantial, with more than 95% of the range being removed in terms of computations.

Further savings are possible when the complexity reduction in relation to the first problem is considered. First, it is clear that the difference $1-F_{PowerSample}(j,k)$ i.e. the complementary cumulative distribution function, only needs to be computed in the region where there is a fast change between 1 and 0. Whenever $1-F_{PowerSample}(j,k)$ is sufficiently close to 1, the multiplication of the quantity into Equation (7) can be skipped since any number multiplied by 1 equals the original number. More importantly, since $1-F_{PowerSample}(j,k)$ is a decreasing function it follows that the multiplication can be skipped for all power grid indices below a specific first index that is characterized by the fact that $1-F_{PowerSample}(j,k_{ThresholdLow}^{1-F}(j))$ is sufficiently close to 1. Note that it is in fact not even necessary to compute $1-F_{PowerSample}(j,k)$ for indices below $k_{ThresholdLow}^{1-F}(j)$. In the same way it can be argued that all multiplications above another power grid index $k_{ThresholdHigh}^{1-F}(j) > k_{ThresholdLow}(j)$ can also be skipped, this time replacing also the result cdfTest(k) with zero.

It is noted that the power grid regions where nontrivial computations, according to the above described embodiments, need to be performed can be characterized by the following set of indices and intervals:

First, $k_{Threshold}^{f}(i) \leq k \leq k_{ThresholdHigh}^{f}(i)$, determined by the fact that $f_{PowerSample}(i,k)$ is sufficiently small, for each discretized probability density function within the sliding window. Complexity is reduced by avoiding computation of $f_{PowerSample}(i,k)$ and the corresponding entry of Equation (1), for all power grid indices k outside the above interval, and for each i.

Note that also $1-F_{PowerSample}(i,k)$ can be set to zero strictly outside the above interval (to avoid a division by zero). Note also that an upper and lower threshold index is required for each discretized probability distribution function within the sliding window.

Second, $k_{ThresholdLow}^{1-F}(j) \leq k \leq k_{ThresholdHigh}^{1-F}(j)$, determined by the fact that $1-F_{PowerSample}(j,k)$ is sufficiently close to 1 ($k_{ThresholdLow}^{1-F}(j)$) or sufficiently close to 0 ($k_{Threshold}^{1-F}(j)$), for each discretized cumulative probability density function within the sliding window. Complexity is reduced by avoiding computation of $1-F_{PowerSample}(j,k)$ for power grid indices outside the interval. The corresponding entry of the product of Equation (7) is set to zero for all power grid indices above $k_{ThresholdHigh}^{1-F}(j)$, each j, and is left unaffected (no looping required) for all power grid indices below $k_{ThresholdLow}^{1-F}(j)$, each j.

Thirdly, noting that each entry of the sliding window tends to cut away portions of the cumulative distribution of Equation (7) from above, a further complexity reduction can be obtained by the introduction of an index $k_{Threshold}^{cdfTest}$, that e.g. keeps track of the highest power grid index where Equation (7) is nonzero, during the formation of the product that involves a loop over the sliding window. The obtained complexity reduction is obtained by looping from above and downwards, starting at $\min(k_{Threshold}^{cdfTest}, k_{ThresholdHigh}^{1-F}(j))$ and ending at $k_{ThresholdLow}^{1-F}(j)$, each j. In this way no multiplication is performed for power grid indices where Equation (7) has already been reduced to 0.

In the implementation, the complexity reduction described above is implemented by at least two, possibly 4, arrays of indices, each array holding $N_{PowerSamples}$ indices. In addition, one index that keeps track on the momentary maximal power grid index, such that Equation (7) is greater than zero, is kept updated.

The generation and use of the above complexity reduction steps are illustrated by the C++ code in Appendix C and Appendix D.

As stated above, the computation of $f_{PowerSample}(i,k)$ and $F_{PowerSample}(i,k)$ normally require use of the exponential and complementary error functions of the C++ mathematical library. Unless there is hardware support for this, the execution of such transcendental functions require significantly more computational effort than does the execution of e.g. a floating point multiply. In order to reduce the computational complexity it is hence a good idea, according to a specific embodiment of a method according to the invention, to implement these functions with linear interpolation in a stored table of function values.

It should be noted, according to another specific embodiment, that it is especially beneficial to create a table over revPower(i,k)=1−$F_{PowerSample}$(i,k) since this saves one subtraction per call.

Further embodiments of complexity reducing steps of the method according to the invention can be summarized as follows.

An embodiment comprising a solution to the problem of allowing several instances of the rise over thermal estimation algorithm to run in parallel is based on the observation that the thermal noise power floor estimation is by far the most computationally intense part of the rise over thermal estimator. Furthermore, the thermal noise power floor changes much more slowly than the measured total wideband power and the estimated RoT. It is hence recognized that it is:

Not necessary to update the estimated thermal noise power floor as frequently as the RoT estimate.

Not necessary to use all estimated power samples as inputs to the thermal noise power floor estimator. This is also beneficial from a memory consumption point of view.

The above observations are exploited in the following way to reduce the computational complexity. The method for noise floor estimation is part of a RoT estimation object in C++. At initiation of an instance of said object, the so-called constructor of the C++ object is called. The constructor creates and initiates all variables and constants that are needed for the execution of the RoT estimation instance. In particular, the constructor initiates certain specified static variables that persist during the life of the instance, these variables are denoted attributes.

A first aspect of the embodiment consists of including an integer attribute that is incremented one, or several, steps, each time the constructor is called. This attribute is denoted an instance counter. The result is typically that the instance counter receives the value 0 for the first instance of the RoT estimator, the value 1 for the second instance of the RoT estimator, and so on.

A second aspect of the embodiment consists of adding the instance counter multiplied with an integer multiple of the sample rate, to the system time that is common to all instances on the same computer board. The result is an instance time that is shifted between successive instances of the RoT estimation algorithm.

Finally, a third aspect of the embodiment consists of using the instance time to check when the instance time modulo a pre-specified number of sampling periods equals zero (e.g.), and to execute an update of the thermal noise power floor only when this is true. Since the instance times are shifted with respect to each other, so will the update of the thermal noise power floor (that dominates the computational complexity). Hence, the computationally intense parts of the different instances will never collide—rather they are spread out in time.

Additional Complexity Reduction Steps

Further complexity reduction is obtained by using a float (4 byte) implementation for all floating-point arithmetic. Furthermore, the generation and storage of the values of $f_{PowerSample}$(i,k)

and revPower(i,k)=1−$F_{PowerSample}$(i,k)

should preferably be implemented with circular buffers. This standard technique uses a pointer to the next free or oldest used vector location in the buffer, this pointer indicating the index of the next vector store operation of the circular buffer.

In addition to the above-discussed algorithms, the interfacing of them into the existing RBS system needs some enhancements. The purpose of this section is the discuss these.

In the description above, it is assumed that the power estimations concern uplink communication. The power measurements are in such cases performed by a node in the radio access network (RAN), typically the radio base station. However, at least parts of the procedure, e.g. the determining and/or estimating steps may also be performed in other parts of the communication network, e.g. in a radio network controller (RNC).

Figure 9:
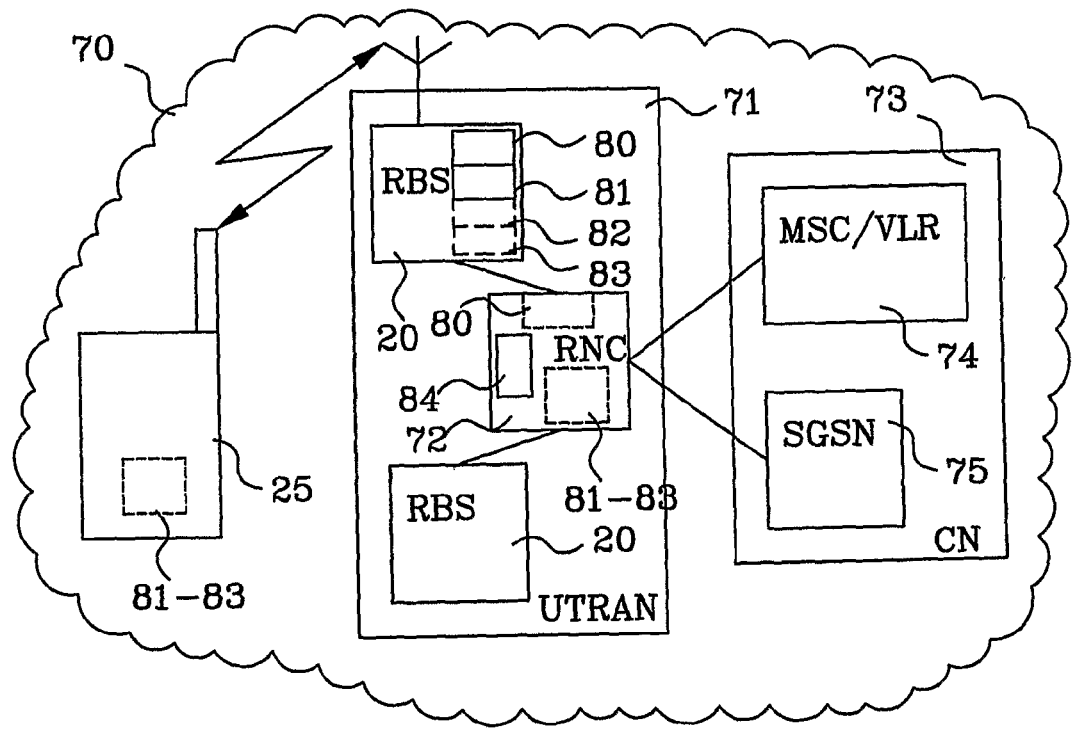
FIG. 9 illustrates a system according to the invention.

FIG. 9 illustrates main parts of an embodiment of a system according to the present invention. A wireless communication system 70 comprises a Universal mobile telecommunication system Terrestrial Radio Access Network (UTRAN) 71. A mobile terminal 25 is in radio contact with a RBS 20 in the UTRAN 71. The RBS 20 is controlled by a RNC 72, which in turn is connected to a Mobile services Switching Centre/Visitor Location Register (MSC/VLR) 74 and a Serving General packet radio system Support Node (SGSN) 75 of a core network (CN) 73.

In this embodiment, the RBS 20 further comprise means for determining 80, for a respective of a plurality of power grid points k, a product of complementary cumulative distribution functions, each corresponding to a respective of the plurality of wideband power distribution estimates i. The RBS 20 further comprise means 81 for determining, for each of the plurality of power grid points, a conditional probability distribution function of a minimum of said plurality of provided wideband power estimate distributions, based on said determined product. Optionally, the RBS 20 also comprises means for determining 82 a mean value over said plurality of power grid points of said determined conditional probability distribution function to provide a noise floor estimate.

According to a specific embodiment, the RBS 20 additionally comprises means 83 for reducing the number of power grid points for which calculations need to be performed, thus further reducing the computational complexity of the soft noise floor power estimations of the present invention.

The different means 80-83 can according to further embodiments be located within the RBS 20, as discussed above, or the RNC 72 or a mobile or user terminal 25. In the latter case the invention concerns downlink noise floor estimation. This is indicated by the dashed boxes in the RNC 72 and the user terminal 25.

In addition to the above described features, the RNC 72 can according to known measures comprise means 84 for admission control. The means 84 for admission control comprises preferably functionality for enhanced uplink control, and is connected to the RBS 20 for information exchange, in particular concerning noise rise estimates.

Advantages of the Invention Comprise:

Reduction of the computational complexity of a possible RoT estimator by more than 95% (for an optimal implementation of all measures), without losing any performance, Allows multiple instances of the RoT estimation algorithm to execute on one computer board.

The embodiments described above are to be understood as a few illustrative examples of the present invention. It will be understood by those skilled in the art that various modifications, combinations, and changes may be made to the embodiments without departing from the scope of the present invention. In particular, different part solutions in the different embodiments can be combined in other configurations, where technically possible. However, the scope of the present invention is defined by the appended claims.

REFERENCES

H. Holma and A. Toskala, WCDMA for UMTS—Radio Access for Third Generation Mobile Conmmiunications. Chichester, UK: Wiley, 2000.

APPENDIX A

Powers, Load Factors and Noise Rise

A mathematical approach to the powers and interference measurements is presented here. Powers and interference measurements are defined before de-spreading. If values after de-spreading are sought, a scaling with the spreading factor is needed. Similar scaling can be applied in order to transform quantities to any level of the signal processing chain. In order to be consistent with the above main assumption, the code power-to-interference ratio (C/I) referenced below refers to the code power-to-interference ratio before de-spreading. This is sometimes reflected by the notation $(C/I)_{chip}$ where the subscript chip refers to the powers at chip rate.

The interference level for the control channel i by definition obeys:

$$(C/I)_{chip,i}(t) = \frac{P_i^{Code,Control}(t)}{P^{Total}(t) - P_i^{Code,Control}(t)} \Leftrightarrow \tag{A1}$$

$$P_i^{Code,Control}(t) = \frac{1}{1 + \frac{1}{(C/I)_{chip,i}(t)}} P^{Total} \Leftrightarrow$$

$$P_i^{Code}(t) = \frac{1 + \eta_i(t)}{1 + \frac{1}{(C/I)_{chip,i}(t)}} P^{Total}(t)$$

where $P_i^{Code,Control}(t)$ is the code channel powers for control channels i, $P^{Total}(t)$ is a total received power, and $\eta_i(t)$ is a known scale factor between control and data channel powers.

Hence, it follows that a load factor $L_i^{Tar}(t)$, can be expressed as:

$$L_i^{Tar}(t) = \frac{1 + \eta_i(t)}{1 + \frac{1}{(C/I)_{chip,i}^{Tar}(t)}}, \tag{A2}$$

where $^{Tar}$ refers to target values.

Note that the time index indicates the (slow) outer power control loop update of the relative interference value.

Also note that a corresponding relation between code power $P_i^{Code}(t)$ and total power $P^{Total}(t)$ before de-spreading, expressed in terms of the SIR (Signal-to-Interference Ratio) value, defined after de-spreading, is:

$$P_i^{Code}(t) = \frac{1 + \eta_i(t)}{1 + \frac{N_i}{SIR_i(t)}} P^{Total}(t) \tag{A3}$$

where $N_i$ is the spreading factor.

The sought quantity for load estimation is typically the noise rise, $N_R(t)$, defined by $$N_R(t) = \frac{P^{Total}(t)}{P_N}, \tag{A4}$$

where $P_N$ is the thermal noise level as measured by the antenna connector. It remains to mathematically define what is meant with $P^{Total}(t)$. The definition used here is:

$$P^{Total}(t) = \sum_{i=1}^{N} P_i^{Code}(t) + P^{E+N}(t) + P_N, \tag{A5}$$

$$P^{E+N}(t) = P^E(t) + P^N(t) \tag{A6}$$

measured at the antenna connector. Here $P^N(t)$ denotes the power as received from neighbour cells and $P^E(t)$ denotes the power as received from sources external to the WCDMA system. The major difficulty is here the need to separate the thermal noise power $P_N$ from the interference from neighbour cells and external sources, $P^{E+N}(t)$.

APPENDIX B

Estimation of the Conditional Probability Distribution of a Minimum Power $$\min_{t' \in [t-T_{Lag}, t]} P^{Total}(t').$$

Note: It is very natural to estimate minimum powers. However, the choice to use the minimum value is really ad-hoc. In a general case, an extreme value of a quantity in some way dependent on the estimated $P^{Total}$ quantity would be possible to use as a base for the further computations. However, as a simplest embodiment the quantity $$\min_{t' \in [t-T_{Lag}, t]} P^{Total}(t')$$

is considered here. Note that $P^{Total}$ in the coming discussion refers to the received total wideband power. In this appendix t is used to denote time.

Notation, Conditional Probability and Baye's Rule

In the following Bayes rule and the definition of conditional mean, for probability distributions, are used extensively. The following definitions and results can be found e.g. in any text book on estimation.

Probability distributions: Consider two events A and B, with probability distributions $f_A(x)$ and $f_B(y)$, respectively. Then the joint probability distribution of A and B is denoted $f_{A,B}(x,y)$.

Note that the events and the conditioning are expressed by subscripts, whereas the independent variables appear within the parentheses. This notation is used only when probability distributions and cumulative probability distributions are used. When state estimates and covariances, e.g. of the Kalman filter, are referred to, the conditioning may also appear within parentheses.

Conditional probability distributions: The conditional probability distributions $f_{A|B}(x)$ and $f_{B|A}(y)$ are defined by:

$$f_{A,B}(x,y) = f_{A|B}(x)f_B(y) = f_{B|A}(y)f_A(x) \tag{B1}$$

Note that as a consequence of the notation for probability distributions, also the conditioning is expressed as subscripts.

A solution of the above equation now results in the famous Bayes rule:

$$f_{A|B}(x) = \frac{f_{B|A}(y)f_A(x)}{f_B(y)}. \tag{B2}$$

Note that the rules above are best understood by using intersecting circle diagrams. The formal proofs to obtain the results for probability distributions can e.g. use infinitesimal limiting versions of motivations for the probability cases.

Conditional Probability of the Minimum—Model and General Expressions

In this section some general properties of a minimum estimator are derived. Towards that end, the following notation is introduced. The Kalman filter or Kalman smoother estimate of $P^{Total}(t')$ is denoted by:

$$\hat{x}_{pTotal}^{Kalman}(t'|Y^t) \equiv \hat{x}_{pTotal}^{Kalman}(t' \mid \{y(s)\}_{s \in [-\infty, t]}) = \tag{B3}$$

$$\hat{x}_{pTotal}^{Kalman}(t' \mid \{y(s)\}_{s \in [t-T_{Lag}, t]}, \hat{x}_{pTotal}^{Kalman}(t - T_{Lag} \mid Y^{t-T_{Lag}})).$$

Here t' denotes some time within $\lfloor t-T_{Lag}, t \rfloor$. The conditional distributions are, under mild conditions, all Gaussian sufficient statistics, i.e. only second order properties are needed in order to describe the conditional probability distributions. This is reflected in the conditioning in the last expression of (B3). The conditional distributions follow as:

$$f_{\hat{x}_{pTotal}^{Kalman}(t')|Y^t}(x) \in N(\hat{x}_{pTotal}^{Kalman}(t'|t), (\sigma_{pTotal}^{Kalman}(t'|t))^2), \tag{B4}$$

where $^{Kalman}$ indicates that the estimate is computed with the Kalman filter or, if t'<t, the Kalman smoother. The quantities $\hat{x}_{pTotal}^{Kalman}(t'|t)$ and $(\sigma_{pTotal}^{Kalman}(t'|t))^2$ denote the power estimate and the corresponding covariance, respectively, i.e. the inputs to the estimator. Note that (B4) assumes that the corresponding estimate at time $t-T_{Lag}$ is used as initial value for the Kalman filter.

Then the conditional distribution for the minimum value of the power estimate can be further developed. Towards that end the following model is assumed for the relation between $x_{pTotal}^0(t') = P^{0,Total}(t')$ that represents the true power and $\hat{x}_{pTotal}^{Kalman}(t'|t) = \hat{P}^{Total}(t'|t)$ that represents the estimate:

$$x_{pTotal}^0(t') = \hat{x}_{pTotal}^{Kalman}(t' \mid t) + \Delta x_{pTotal}(t' \mid t) \tag{B5}$$

$$x_{pTotal}^0(t') \in N(\hat{x}_{pTotal}^{Kalman}(t' \mid t), (\sigma_{pTotal}^{Kalman}(t' \mid t))^2). \tag{B6}$$

This is in line with the above discussion on sufficient statistics. The notation for the distribution of $\Delta x_{pTotal}(t'|t)$ is henceforward simplified to:

$$f_{\Delta x}(x). \tag{B7}$$

Note that this distribution does not have to be assumed to be Gaussian (although this is mostly the assumption made).

The conditional probability distribution of the minimum value of $x_{pTotal}^0(t') = P^{0,Total}(t')$, $t' \in \lfloor t-T_{Lag}, t \rfloor$ is then to be estimated using data y(t), obtained from the time interval $[-\infty, t]$.

As will be seen below, smoother estimates are theoretically required as inputs to the conditional probability estimation algorithm for the minimum power that operates over the time interval $\lfloor t-T_{Lag}, t \rfloor$. To formally retain optimality in the development, the smoother estimates should also be calculated using all data in $\lfloor t-T_{Lag}, t \rfloor$. However, in a practical implementation, these smoother estimates are typically computed using only a short snapshot of data around the selected smoothing time instance. Several such smoothing estimates, from $\lfloor t-T_{Lag}, t \rfloor$, are then combined to estimate the conditional probability distribution. In the coming discussion the interval $\lfloor t-T_{Lag}, t \rfloor$ is retained in all quantities though, so as not to complicate the development too much. A further simplification can be obtained by replacement of the smoother estimate with a Kalman filter estimate. Simulations indicate that this can be done with very little loss of performance.

The conditional distribution of the minimum value can now be written as follows (cf. (B5)):

$$f_{min\{x_{pTotal}^0(t')\}_{t' \in [t-T_{Lag},T]} \mid Y^t, min\, x_{pTotal}^0(t-T_{Lag})}(x), \tag{B8}$$

where the last quantity of (B8) denotes the initial information of the minimum value. In the following Bayes rule and the definition of conditional mean, for probability distributions, are used extensively.

Then apply Bayes rule and the definition of conditional probability to (B8) using the definitions:

$$A := \min\{x_{pTotal}^0(t')\}_{t' \in [t-T_{Lag}, t]}$$

$$B := \min x_{pTotal}(t-T_{Lag})$$

$$C := Y^t$$

The following chain of equalities then holds, using Bayes rule, the definition of conditional probability distributions, and the result $f_{B,C|A}(x,y) = f_{(B|A),(C|A)}(x,y)$ (the latter result is easily checked by the drawing of a three-circle diagram):

$$f_{A|B,C}(x) = \frac{f_{B,C|A}(x,y)f_A(x)}{f_{B,C}(x,y)} = \tag{B9}$$

$$\frac{f_{(B|A),(C|A)}(x,y)f_A(x)}{f_{B,C}(x,y)} = \frac{f_{(B|A)|(C|A)}(x)f_{C|A}(y)f_A(x)}{f_{B,C}(x,y)} =$$

$$\frac{f_{B|A,C}(x)f_{C|A}(y)f_A(x)}{f_{B,C}(x,y)} = \frac{f_{B|A,C}(x)f_{A|C}(x)f_C(y)}{f_{B,C}(x,y)}.$$

The last step can again be easily verified by drawing circle diagrams. Now, according to the definitions above, the first factor of the numerator of (B9) is a prior and hence the conditioning disappears. The second factor of the numerator will be further expanded below, whereas the last factor of the numerator and the denominator can be treated as parts of a normalizing constant. Back-substitution of the definitions of A, B and C then proves the relation:

$$f_{\min\{x^0_{pTotal}(t')\}_{t'\in[t-T_{Lag},t]}|Y^t,\min x^0_{pTotal}(t-T_{Lag})}(x) = \qquad (B10)$$
$$\frac{1}{c}f_{\min\{x^0_{pTotal}(t')\}_{t'\in[t-T_{Lag},t]}|Y^t}(x)f_{\min x^0_{pTotal}(t-T_{Lag})}(x).$$

One consequence of (B10) that needs to be kept in mind is that a smoothing problem is at hand. The Kalman filtering based pre-processing step treated above hence formally needs to include a Kalman smoother step. In practice, the Kalman filter is normally sufficient though.

Final Expansion of the Conditional Mean of the Minimum Power

The starting point of this subsection is equation (B10) that states that the conditional pdf (probability distribution function) is given as the product of a prior (initial value) and a measurement dependant factor. The prior is supplied by the user and should reflect the prior uncertainty regarding $P_N$. Note that whenever the sliding window is moved and a new estimate is calculated, the same prior is again applied. The prior is hence not updated in the basic setting of the estimator.

To state the complete conditional pdf some further treatment of the first factor of (B10) is needed. The error distribution $f_{\Delta P}(x)$ of (B7), together with the definitions (B5) and (B6) will be central towards this end. Further, in the calculations below, F( ) denotes a cumulative distribution, i.e. the integral of $f$. Pr(.) denotes the probability of an event.

The following equalities now hold for the first factor of (B10):

$$F_{\min\{x^0_{pTotal}(t')\}_{t'\in[t-T_{Lag},t]}|Y^t}(x) = \qquad (B11)$$
$$Pr\left(\min\{x^0_{pTotal}(t')\}_{t'\in[t-T_{Lag},t]} \leq x \mid Y^t\right) = 1 - Pr\left(\min\{x^0_{pTotal}(t')\}_{t'\in[t-T_{Lag},t]} > x \mid Y^t\right) =$$
$$1 - Pr\left(\forall\, t',\, \Delta x_{pTotal}(t'\mid t) > x - \hat{x}^{Kalman}_{pTotal}(t'\mid t)\right) =$$
$$1 - \prod_{t'\in[t-T_{Lag},t]} Pr\left(\Delta x_{pTotal}(t'\mid t) > x - \hat{x}^{Kalman}_{pTotal}(t'\mid t)\right) =$$
$$1 - \prod_{t'\in[t-T_{Lag},t]}\left(1 - Pr\left(\Delta x_{pTotal}(t'\mid t) \leq x - \hat{x}^{Kalman}_{pTotal}(t'\mid t)\right)\right) =$$
$$1 - \prod_{t'\in[t-T_{Lag},t]}\left(1 - F_{\Delta x(t'\mid t)}\left(x - \hat{x}^{Kalman}_{pTotal}(t'\mid t)\right)\right).$$

The fourth equality of (B11) follows from the assumption that the Kalman smoother provides a sufficient statistics, i.e. (B5) and (B6). The last equality follows from (B7). Obviously, the most natural assumption is to use a Gaussian distribution for $F_{\Delta P(s)}$. However, (B11) actually allows other distributions as well.

The final step in the derivation of the first factor of the distribution function is to differentiate (B11), obtaining:

$$f_{\min\{x^0_{pTotal}(t')\}_{t'\in[t-T_{Lag},t]}|Y^t}(x) = \frac{dF_{\min\{x^0_{pTotal}(t')\}_{t'\in[t-T_{Lag},t]}|Y^t}(x)}{dx} = \qquad (B12)$$
$$\sum_{t'\in[t-T_{Lag},t]} f_{\Delta x(t'\mid t)}\left(x - \hat{x}^{Kalman}_{pTotal}(t'\mid t)\right)$$
$$\prod_{\substack{q\in[t-T_{Lag},t]\\q\neq t'}}\left(1 - F_{\Delta x(t'\mid t)}\left(x - \hat{x}^{Kalman}_{pTotal}(q\mid t)\right)\right)$$

Combining with (B10), gives the end result:

$$f_{\min\{x^0_{pTotal}(t')\}_{t'\in[t-T_{Lag},t]}|Y^t,\min x^0_{pTotal}(t-T_{Lag})}(x) = \qquad (B13)$$

-continued $$\frac{1}{c}\left(\sum_{t' \in [t-T_{Lag},t]} f_{\Delta x(t'|t)}\left(x - \hat{x}_{pTotal}^{Kalman}(t'|t)\right) \prod_{\substack{q \in [t-T_{Lag},t] \\ q \neq t'}} \left(1 - F_{\Delta x(t'|t)}\left(x - \hat{x}_{pTotal}^{Kalman}(q|t)\right)\right)\right) f_{minx_{pTotal}^0(t-T_{Lag})}(x)$$

This result constitutes the output 64 referred to in connection with FIG. 2.

The expression may look complex. It is fortunately straightforward to evaluate since it is a one dimensional function of Gaussian and cumulative Gaussian distributions given by:

$$f_{\Delta x(t'|t)}\left(x - \hat{x}_{pTotal}^{Kalman}(t'|t)\right) = \frac{1}{\sqrt{2\pi}\,\sigma_{pTotal}^{Kalman}(t'|t)} e^{-\frac{\left(x - \hat{x}_{pTotal}^{Kalman}(t'|t)\right)^2}{2\left(\sigma_{pTotal}^{Kalman}(t'|t)\right)^2}} \quad (B14)$$

$$F_{\Delta x(t'|t)}\left(x - \hat{x}_{pTotal}^{Kalman}(t'|t)\right) = \quad (B15)$$
$$\int_{-\infty}^{x - \hat{x}_{pTotal}^{Kalman}(t'|t)} f_{\Delta x(t'|t)}(y)\,dy = \frac{1}{2}\mathrm{erfc}\left(-\frac{\left(x - \hat{x}_{pTotal}^{Kalman}(t'|t)\right)}{\sqrt{2}\,\sigma_{pTotal}^{Kalman}(t'|t)}\right).$$

The quantities $\hat{x}_{pTotal}^{Kalaman}(t'|t)$ and $\sigma_{pTotal}^{Kalaman}(t'|t)$ are readily available as outputs from the Kalman smoother, or the simpler Kalman filter.

If a noise floor value is to be provided as an output, a mean value computation is performed on the output distribution.

In summary, the above derived expression can be rewritten as $$f_{min}(P_k) = \quad (B16)$$
$$\sum_{i=1}^{N_{PowerSamples}} \left( f_{PowerSample}(i,k) \sum_{\substack{j=1 \\ j \neq i}}^{N_{PowerSamples}} (1 - F_{PowerSample}(j,k)) \right)$$

APPENDIX C

Example 1

Target C++ code. The most important lines of code are marked in bold:

```
// Compute product and determine boundary indices
for (j=0;j<powerGridSize; j++)
{
    cdfTest[j]=1.0;
}
i=0;
j=0;
while ((j<powerGridSize) && (revPowerCdf[0][j]>1.0e-7))
{
    cdfTest[j]*=revPowerCdf[0][j];
    j++;
}
upperNonzeroIndex=j-1;
for (j=upperNonzeroIndex+1; j<powerGridSize; j++)
{
    cdfTest[j]=0.0;
}
almostOne=1-0.000001;
for (i=1; i<currentNumberOfSamples; i++)
```

-continued

```
{
    j=upperNonzeroIndex;
    while ((j>=0) && (revPowerCdf[i][j]<almostOne))
    {
        if (revPowerCdf[i][j]<1.0e-7)
        {
            upperNonzeroIndex=j-1;
        }
        cdfTest[j]*=revPowerCdf[i][j];
        j--;
    }
    lowerNononeIndex[i]=j+1;
}
// Compute the unnormalized minPowerPdf is computed
for (j=0; j<powerGridSize; j++)
{
    sumArray[j]=0.0
}
for (i=0;i<currentNumberOfSamples; i++)
{
    for (j=lowerNononeIndex[i]; j<upperNonzeroIndex+1; j++)
    {
        if (revPowerCdf[i][j]>1e-6)
        {
            sumArray[j]+=cdfTest[j]*powerPdf[i][j]/revPowerCdf[i][j];
        }
    }
}
for (j=0; j<powerGridSize; j++)
{
    unnormalizedMinPowerPdf[j]=sumArray[j]*priorPowerPdf[j];
}
```

APPENDIX D

Example 2

Target C++ code. The most important lines of code are marked in bold.:

```
// Power grid index limitations
double maxGaussArgument=powerGrid[startIndex];
const double breakQuotient=log(1e-16);
double
argumentLimit=sqrt(maxGaussArgument*maxGaussArgument-
2*RTWPStandardDeviationUpdate*RTWPStandardDeviationUpdate
*breakQuotient);
for (j = startIndex; j < powerGridSize; j++) // Loop from peak and up
{
    double tmp=powerGrid[j]-RTWPUpdate;
    if (fabs(tmp)<argumentLimit) // Equivalent to limitation index
    {
        powerPdf[circularBufferCounter][j] =
1/(sqrt(2*pi)*RTWPStandardDeviationUpdate) * exp(-
tmp*tmp/(2*(RTWPStandardDeviationUpdate) *
(RTWPStandardDeviationUpdate)));
    }
    else
    {
        powerPdf[circularBufferCounter][j]=0.0;
    }
}
```

-continued

```
    for (j = startIndex; j >=0; j--) // Loop from peak and down
    {
        double tmp=powerGrid[j]-RTWPUpdate;
        if (fabs(tmp)<argumentLimit) // Equivalent to limitation index
        {
            powerPdf[circularBufferCounter][j] =
1/(sqrt(2*pi)*RTWPStandardDeviationUpdate)*exp(-
tmp*tmp/(2*(RTWPStandardDeviationUpdate) *
(RTWPStandardDeviationUpdate)));
        }
        else
        {
            powerPdf[circularBufferCounter][j]=0.0;
        }
    }
}
```

APPENDIX E

Example 3

Target C++ code. Erfc-table.

```
// erfc-table
// Compute revPowerCdf
for (j=0; j<powerGridSize; j++)
{
    argument=(powerGrid[j]-
RTWPUpdate)/(sqrt(2)*RTWPStandardDeviationUpdate);
    if (argument>=5.5)
    {
        revPowerCdf[circularBufferCounter][j]=0.0;
    }
    if (argument<=-5.5)
    {
        revPowerCdf[circularBufferCounter][j]=1.0;
    }
    if ((argument>-5.5) && (argument<5.5))
    {
        lowerEntry=((int) floor(argument/tableResolution))+55;
        revPowerCdf[circularBufferCounter][j] =
erfTable[lowerEntry]+(erfTable[lowerEntry+1]-
erfTable[lowerEntry])*(argument-
argTable[lowerEntry])/(argTable[lowerEntry+1] -
argTable[lowerEntry]);
    }
}
```

APPENDIX F

Example 4

Target C++ code. Instance based noise floor estimation trigger.

```
if (((loopCounter+instanceCounter)%(int)
(powerSamplingSpacing/tEul))==0)
{
    // Execute noise floor estimation...
    .
    .
    .
}
```

The invention claimed is:

1. A method of complexity reduced noise floor estimation in a wireless communications system, said method performed by a radio base station and comprising the steps of:

determining, for a respective one of at least a subset of a plurality of power grid points k, a product of complementary cumulative distribution functions, each said complementary cumulative distribution function corresponding to a respective one of a plurality j of provided wideband power measure estimates in a sliding window; and determining, for each of said at least subset of the plurality of power grid points, a probability distribution function of a minimum of said plurality of wideband power measure estimates based on said determined product.

2. The method according to claim 1, further comprising determining a mean value over said subset of power grid points of said determined probability distribution function to provide a noise floor estimate.

3. The method according to claim 1, comprising determining said probability distribution function by adding, over said plurality of wideband power estimates, a product of a probability distribution function of the provided wideband power measure estimate for power sample i and said determined product of complementary cumulative distribution functions divided by the complementary cumulative distribution function for power sample i.

4. The method according to claim 1, where said subset comprises all power grid points.

5. The method according to claim 3, where said product of complementary cumulative distribution functions is calculated over said plurality of provided wideband power measure estimates $N_{PowerSamples}$ according to:

$$\prod_{j=1}^{N_{PowerSamples}} (1 - F_{PowerSample}(j, k))$$

where j denotes an index of one of said provided wideband power measure estimates and k denotes an index of said plurality of power grid points, and $F_{PowerSamples}(j,k)$ comprises said cumulative distribution function; and where a probability distribution $f_{min}(P_k)$ for each of said plurality of power grid points $P_k$ is calculated according to $$f_{min}(P_k) = \sum_{i=1}^{N_{PowerSample}} \left( \frac{f_{PowerSample}(i, k)}{1 - F_{PowerSample}(i, k)} \prod_{j=1}^{N_{PowerSamples}} (1 - F_{PowerSample}(j, k)) \right)$$

where $f_{PowerSamples}(i,k)$ is the probability distribution function of the i:th of said provided power measure estimates, and $1-F_{PowerSamples}(i,k)$ represents the complementary cumulative distribution function of the i:th of said provided wideband power measure estimates.

6. The method according to claim 5, where if $f_{PowerSample}(i,k)$ is smaller than a predetermined threshold values its value is set to zero for all power grid points outside an interval $k_{ThresholdLow}^f \leq k \leq k_{ThresholdHigh}^f$, and the probability distribution $f_{min}(P_k)$ is only determined for power grid points within said interval.

7. The method according to claim 5, where if said complementary cumulative distribution function is close to 1, corresponding to a lower threshold grid point index $k_{ThresholdLow}^{1-F}(j)$ or close to 0, corresponding to an upper threshold grid point index $k_{ThresholdHigh}^{1-F}(j)$, the complementary cumulative distribution function is only calculated for grid point indices $k_{ThresholdLow}^{1-F}(j) \leq k \leq k_{ThresholdHigh}^{1-F}(j)$ further said determined product of complementary cumulative distribution functions is set to 0 for all grid points $k > k_{ThresholdHigh}^{1-F}(j)$ and is only determined within the interval $k_{ThresholdLow}^{1-F}(j) \leq k \leq k_{ThresholdHigh}^{1-F}(j)$.

8. The method according to claim 7, further comprising determining a highest power grid point index $k_{Threshold}^{product}$ for which said product of complementary cumulative distribution functions is non-zero, and determining said product over all j for all grid point indices k in the interval $\min(k_{Threshold}^{product,k}{}_{ThresholdHigh}^{1-F}(j)) \geq k \geq k_{ThresholdLow}^{1-F}(j)$.

9. The method according to claim 5, where a quantity $F_{PowerSample}(j,k)$ and/or $f_{PowerSample}(i,k)$ is determined by means of tabulated values.

10. A system for complexity reduced noise floor estimation in a wireless communications system, said system comprising:
 means for determining, for a respective one of at least a subset of a plurality of power grid points k, a product of complementary cumulative distribution functions, each corresponding to a respective one of a plurality j of provided wideband power measure estimates i in a sliding window;
 means for determining, for each of said at least a subset of the plurality of power grid points, a probability distribution function of a minimum of said plurality of wideband power measure estimates based on said determined product.

11. The system of claim 10, further comprising means for determining a mean value over said subset of power grid points of said determined probability distribution function to provide a noise floor estimate.

12. The system according to claim 10, where said determining means determines said probability distribution function by adding, over said plurality of wideband power estimates, a product of a probability distribution function of the provided wideband power measure estimate for power sample i and said determined product of complementary cumulative distribution functions divided by the complementary cumulative distribution function for power sample i.

13. The system according to claim 10, where said subset comprises all power grid points.

14. A node in a wireless communications system, said node comprising:
 means for determining, for a respective one of a plurality of power grid points k, a product of complementary cumulative distribution functions, each said complementary cumulative distribution function corresponding to a respective one of a plurality j of provided wideband power measure estimates i in a sliding window;
 means for determining, for each of said plurality of power grid points, a probability distribution function of a minimum of said plurality of provided wideband power measure estimates, based on said determined product.

15. The node according to claim 14, further comprising means for determining a mean value over said plurality of power grid points of said determined probability distribution function to provide a noise floor estimate.

16. The node according to claim 14, where said node is one of a radio network controller, a radio base station or a mobile terminal.

* * * * *

UNITED STATES PATENT AND TRADEMARK OFFICE
CERTIFICATE OF CORRECTION

PATENT NO. : 8,175,537 B2
APPLICATION NO. : 12/307345
DATED : May 8, 2012
INVENTOR(S) : Wigren It is certified that error appears in the above-identified patent and that said Letters Patent is hereby corrected as shown below:

On the Face Page, in Field (75), under "Inventor", in Column 1, Line 1,
delete "Torbjorn" and insert -- Torbjörn --, therefor.

On the Face Page, in Field (73), under "Assignee", in Column 1, Line 2,
delete "(publ)" and insert -- (publ), Stockholm --, therefor.

In FIG. 8, Sheet 7 of 8, in Box, in Line 2, delete "$k = 1,...,N_{PoweGrid}$" and
insert -- $k = 1,...,N_{PowerGrid}$ --, therefor.

In Column 4, Line 29, delete "(cf." and insert -- (c.f. --, therefor.

In Column 4, Line 45, "$P_N^{DigitalReciver}$" and insert -- $P_N^{DigitalReceiver}$ --, therefor.

In Column 4, Line 54, delete "$N_R$" and insert -- $N_{R,}$ --, therefor.

In Column 11, Line 4, delete "cdffTest(k)" and insert -- cdfTest(k) --, therefor.

In Column 11, Line 55, delete "1" and insert -- 1, --, therefor.

In Column 15, Line 16, delete "Conmmiunications." and
insert -- Communications. --, therefor.

In Column 15, Line 42, delete "$P^{Total}$" and insert -- $P^{Total\ (t)}$ --, therefor.

In Column 24, Line 40, in Claim 5, delete "$F_{PowerSamples}$" and
insert -- $F_{PowerSample}$ --, therefor.

In Column 24, Line 53, in Claim 5, delete "$f_{PowerSamples}$" and
insert -- $f_{PowerSample}$ --, therefor.

Signed and Sealed this
Thirteenth Day of November, 2012

David J. Kappos
*Director of the United States Patent and Trademark Office*

CERTIFICATE OF CORRECTION (continued)
U.S. Pat. No. 8,175,537 B2

In Column 24, Line 60, in Claim 6, delete "values" and insert -- value, --, therefor.

In Column 25, Line 5, in Claim 7, delete "$k_{ThresholdHigh}^{1-F}(j)$" and insert -- $k_{ThresholdHigh}^{1-F}(j)$, --, therefor.